(12) United States Patent
Nishida et al.

(10) Patent No.: US 10,868,925 B2
(45) Date of Patent: Dec. 15, 2020

(54) OPERATION GUIDE APPARATUS, IMAGE PROCESSING APPARATUS, AND NON-TRANSITORY COMPUTER READABLE MEDIUM

(71) Applicant: FUJI XEROX CO., LTD., Tokyo (JP)

(72) Inventors: Tomoyo Nishida, Kanagawa (JP); Yoshifumi Bando, Kanagawa (JP); Yuichi Kawata, Kanagawa (JP); Hideki Yamasaki, Kanagawa (JP); Ryoko Saitoh, Kanagawa (JP); Kensuke Okamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 77 days.

(21) Appl. No.: 15/353,667

(22) Filed: Nov. 16, 2016

(65) Prior Publication Data
US 2017/0337893 A1 Nov. 23, 2017

(30) Foreign Application Priority Data

May 23, 2016 (JP) ................................. 2016-102544

(51) Int. Cl.
*G09G 5/00* (2006.01)
*G06F 3/01* (2006.01)
*H04N 1/00* (2006.01)

(52) U.S. Cl.
CPC ............. *H04N 1/0035* (2013.01); *G09G 5/00* (2013.01); *H04N 1/00408* (2013.01); *H04N 1/00411* (2013.01); *G09G 2320/068* (2013.01); *G09G 2354/00* (2013.01)

(58) Field of Classification Search
CPC combination set(s) only.
See application file for complete search history.

(56) References Cited

U.S. PATENT DOCUMENTS

| 2005/0178821 A1* | 8/2005 | Ono ....................... G09B 19/00 235/375 |
| 2005/0185215 A1* | 8/2005 | Nishizawa ......... H04N 1/00127 358/1.15 |
| 2006/0171734 A1* | 8/2006 | Maeda ............... G03G 15/5016 399/81 |

(Continued)

FOREIGN PATENT DOCUMENTS

| CN | 101533256 A | 9/2009 |
| JP | 2000-29263 A | 1/2000 |

(Continued)

OTHER PUBLICATIONS

Aug. 27, 2019 Office Action issued in Chinese Patent Application No. 201710009155.5.

(Continued)

*Primary Examiner* — Shourjo Dasgupta
(74) *Attorney, Agent, or Firm* — Oliff PLC

(57) ABSTRACT

An operation guide apparatus includes a display and a processor. The display displays, on a display screen, operation guide information for providing a guide on an operation for continuously using a device. The processor performs processing to enable an operator who is doing the operation with such a posture that the operator is unable to see the operation guide information displayed on the display screen to recognize the operation guide information.

9 Claims, 5 Drawing Sheets

(56) References Cited

U.S. PATENT DOCUMENTS

| | | | | |
|---|---|---|---|---|
| 2008/0165202 | A1* | 7/2008 | Brodersen | H04N 21/4122 345/581 |
| 2009/0232537 | A1* | 9/2009 | Ogasawara | G03G 15/5016 399/81 |
| 2010/0165382 | A1* | 7/2010 | Asano | G06K 9/00228 358/1.15 |
| 2010/0262294 | A1* | 10/2010 | Lai | G06F 3/012 700/275 |
| 2013/0159851 | A1* | 6/2013 | Pawar | G06F 9/453 715/708 |
| 2013/0174205 | A1* | 7/2013 | Jacobsen | H04N 21/43637 725/81 |
| 2014/0307282 | A1* | 10/2014 | Sato | H04N 1/00307 358/1.14 |
| 2015/0373412 | A1* | 12/2015 | Park | G06K 9/00288 725/12 |
| 2017/0126909 | A1* | 5/2017 | Shiranita | H04N 1/00496 |
| 2017/0161320 | A1* | 6/2017 | Venkataraman | G06F 17/30401 |
| 2017/0180578 | A1* | 6/2017 | Nimura | H04N 1/00777 |

FOREIGN PATENT DOCUMENTS

| | | |
|---|---|---|
| JP | 2005-091475 A | 4/2005 |
| JP | 2005-244489 A | 9/2005 |
| JP | 2006-324952 A | 11/2006 |
| JP | 2009-222941 A | 10/2009 |
| JP | 2010-54565 A | 3/2010 |
| JP | 2014-200924 A | 10/2014 |
| JP | 2014-207532 A | 10/2014 |
| JP | 2015-29548 A | 2/2015 |

OTHER PUBLICATIONS

Dec. 24, 2019 Office Action issued in Japanese Application No. 2016-102544.

Jun. 2, 2020 Office Action issued in Chinese Patent Application No. 201710009155.5.

Jul. 14, 2020 Office Action issued in Japanese Patent Application No. 2016-102544.

* cited by examiner

FIG. 3

| USER | REPLACING TONER | | CLEARING PAPER JAM | | ... | FEEDING PAPER | |
| --- | --- | --- | --- | --- | --- | --- | --- |
| | SCREEN DISPLAY | AUDIO GUIDE | SCREEN DISPLAY | AUDIO GUIDE | | SCREEN DISPLAY | AUDIO GUIDE |
| A | NO TILT | NO AUDIO GUIDE | TILT | AUDIO GUIDE | ... | NO TILT | AUDIO GUIDE |
| B | NO SCREEN DISPLAY | NO AUDIO GUIDE | NO SCREEN DISPLAY | NO AUDIO GUIDE | ... | NO SCREEN DISPLAY | NO AUDIO GUIDE |
| C | UNDEFINED | UNDEFINED | UNDEFINED | UNDEFINED | ... | NO TILT | NO AUDIO GUIDE |
| D | MOBILE TERMINAL DISPLAY | NO AUDIO GUIDE | MOBILE TERMINAL DISPLAY | NO AUDIO GUIDE | ... | UNDEFINED | UNDEFINED |
| ... | ... | ... | ... | ... | ... | ... | ... |

OPERATION GUIDE APPARATUS, IMAGE PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-102544 filed May 23, 2016.

BACKGROUND (i) Technical Field

The present invention relates to an operation guide apparatus, an image processing apparatus, and a non-transitory computer readable medium.

(ii) Related Art

Sometimes, operation guide information for providing a guide on an operation for continuously using a device is displayed on a display screen. In the case of adopting a configuration for changing the orientation of the display screen in response to a change in the position of an operator within the viewable range of the operation guide information displayed on the display screen, if the operator is operating with a posture or at a position where the operator is unable to see the operation guide information, the orientation of the display screen remains unchanged. Thus, the operator is unable to recognize the operation guide information.

SUMMARY

According to an aspect of the invention, there is provided an operation guide apparatus including a display and a processor. The display displays, on a display screen, operation guide information for providing a guide on an operation for continuously using a device. The processor performs processing to enable an operator who is doing the operation with such a posture that the operator is unable to see the operation guide information displayed on the display screen to recognize the operation guide information.

BRIEF DESCRIPTION OF THE DRAWINGS

An exemplary embodiment of the present invention will be described in detail based on the following figures, wherein:

FIG. 3 is an illustration of exemplary user setting information stored in a user setting information memory according to the exemplary embodiment of the present invention;

DETAILED DESCRIPTION

Hereinafter, an exemplary embodiment of the present invention will be described in detail with reference to the accompanying drawings.

Hardware Configuration of Image Processing Apparatus

Figure 1:
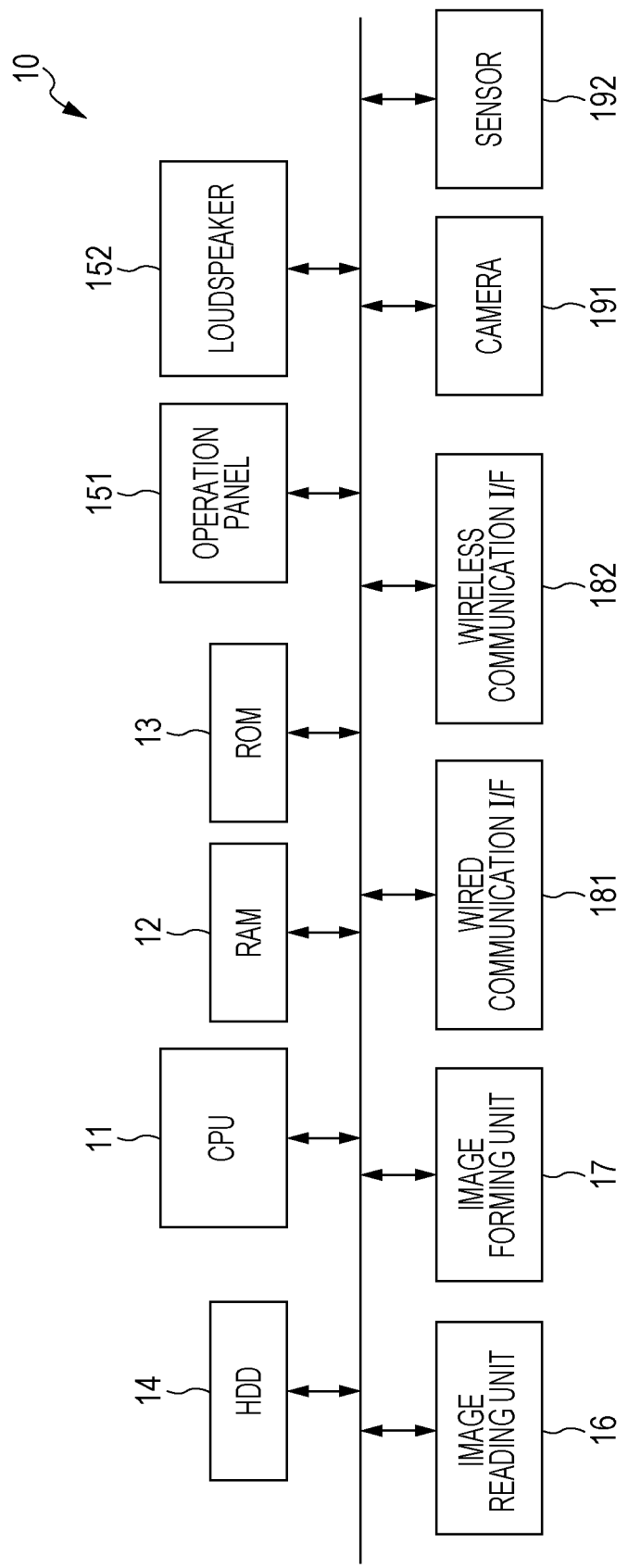
FIG. 1 is a diagram illustrating an exemplary hardware configuration of an image processing apparatus according to an exemplary embodiment of the present invention.

FIG. 1 is a diagram illustrating an exemplary hardware configuration of an image processing apparatus 10 according to the exemplary embodiment. As illustrated in FIG. 1, the image processing apparatus 10 includes a central processing unit (CPU) 11, a random-access memory (RAM) 12, a read-only memory (ROM) 13, a hard disk drive (HDD) 14, an operation panel 151, a loudspeaker 152, an image reading unit 16, an image forming unit 17, a wired communication interface (hereinafter represented as a "wired communication I/F") 181, a wireless communication interface (hereinafter represented as a "wireless communication I/F") 182, a camera 191, and a sensor 192.

The CPU 11 realizes the following functions described later by loading various programs stored in the ROM 13 or the like to the RAM 12 and executing the programs.

The RAM 12 is a memory used as an operation memory for the CPU 11, for example.

The ROM 13 is a memory for storing, for example, various programs executed by the CPU 11.

The HDD 14 is a magnetic disk drive, for example, which stores image data read by the image reading unit 16 or image data used in image formation performed by the image forming unit 17.

The operation panel 151 is a touchscreen, for example, which displays various types of information and receives operation entries input by a user. Here, the operation panel 151 includes a display on which various types of information are displayed, and a position detecting sheet for detecting a position designated with a finger or a stylus pen, for example. Alternatively, a display and a keyboard may be used, instead of a touchscreen. In the exemplary embodiment, the operation panel 151 is provided as an example of a display screen.

The loudspeaker 152 is a device that outputs various types of information as sound.

The image reading unit 16 reads an image recorded on a recording medium such as paper. Here, the image reading unit 16 is a scanner, for example. The image reading unit 16 may be a scanner using a charge coupled device (CCD) system where reflected light of light emitted from a light source to a document is reduced in size by a lens and received by CCDs, or a scanner using a contact image sensor (CIS) system where reflected light of light sequentially emitted from light-emitting diode (LED) light sources to a document is received by a CIS.

The image forming unit 17 forms an image on a recording medium. Here, the image forming unit 17 is a printer, for example. The image forming unit 17 may be a printer using an electrophotographic system that transfers toner adhered on a photoconductor to a recording medium to form an image, or a printer using an inkjet system that discharges ink onto a recording medium to form an image.

The wired communication I/F 181 performs transmission/reception of various types of information with another apparatus by performing wired communication. Here, the wired communication may be Ethernet, for example.

The wireless communication I/F 182 performs transmission/reception of various types of information with another apparatus by performing wireless communication. Here, the wireless communication may be Wi-Fi (registered trademark), for example.

The camera 191 captures an image of the face of a user who stands in front of the image processing apparatus 10, in order to perform face authentication or face recognition. Here, the camera 191 is included at a position near the operation panel 151, for example, which is a position suitable for capturing an image of the face of a user.

The sensor 192 detects that there is a person near the image processing apparatus 10. Here, the sensor 192 may be a pyroelectric sensor using infrared rays, which is capable of detecting a thermal change in front of the image processing apparatus 10.

Overview of Exemplary Embodiment

In the exemplary embodiment, the image processing apparatus 10 is configured to perform processing to enable a user to recognize guide information for an operation that the user is doing on the image processing apparatus 10 when the user is doing the operation with such a posture that the user is unable to see the details displayed on the operation panel 151.

In the exemplary embodiment, it is assumed that the operation being done on the image processing apparatus 10 is particularly an operation for continuously using the image processing apparatus 10. Firstly, examples of the operation include replacement or replenishment of the consumables used for image processing. Among these operations, replacement of the consumables is replacement of, for example, a toner, a drum, a stamp, or a stapler, and replenishment of the consumables is, for example, feeding of paper. Secondly, an example of the operation includes the repairing of a failure that occurred during image processing. The repairing of a failure is, for example, the clearing of a paper jam in the image processing apparatus 10 or a finisher connected to the image processing apparatus 10. Thirdly, an example of the operation includes collection of unwanted materials that occurred during image processing. Collection of unwanted materials is collection of, for example, wastepaper from a wastebasket. Fourthly, an example of the operation includes maintenance done periodically or in the event of failure. These operations are generally done by a user with such a posture that the user is unable to see the details displayed on the operation panel 151; the posture is, for example, crouching down under the image processing apparatus 10.

Processing to enable the user to recognize the guide information includes, for example, processing to tilt the operation panel 151 so that the user is able to see the displayed details (hereinafter this processing will be referred to as a "tilt"), processing to display the guide information on the user's mobile terminal (hereinafter this processing will be referred to as "mobile terminal display"), and processing to output the guide information as sound (hereinafter this processing will be referred to as an "audio guide").

Furthermore in the exemplary embodiment, which processing is to be done to enable the user to recognize the guide information is selectable by the user. Which processing is to be done may be separately set for each type of operation. For example, the following settings may be made: neither a tilt nor an audio guide may be provided in the case of toner replacement; both a tilt and an audio guide are provided in the case of clearing a paper jam; and neither guide information screen display nor an audio guide is provided in the case of feeding paper.

Configuration of Operation Flow Guide Apparatus

Figure 2:
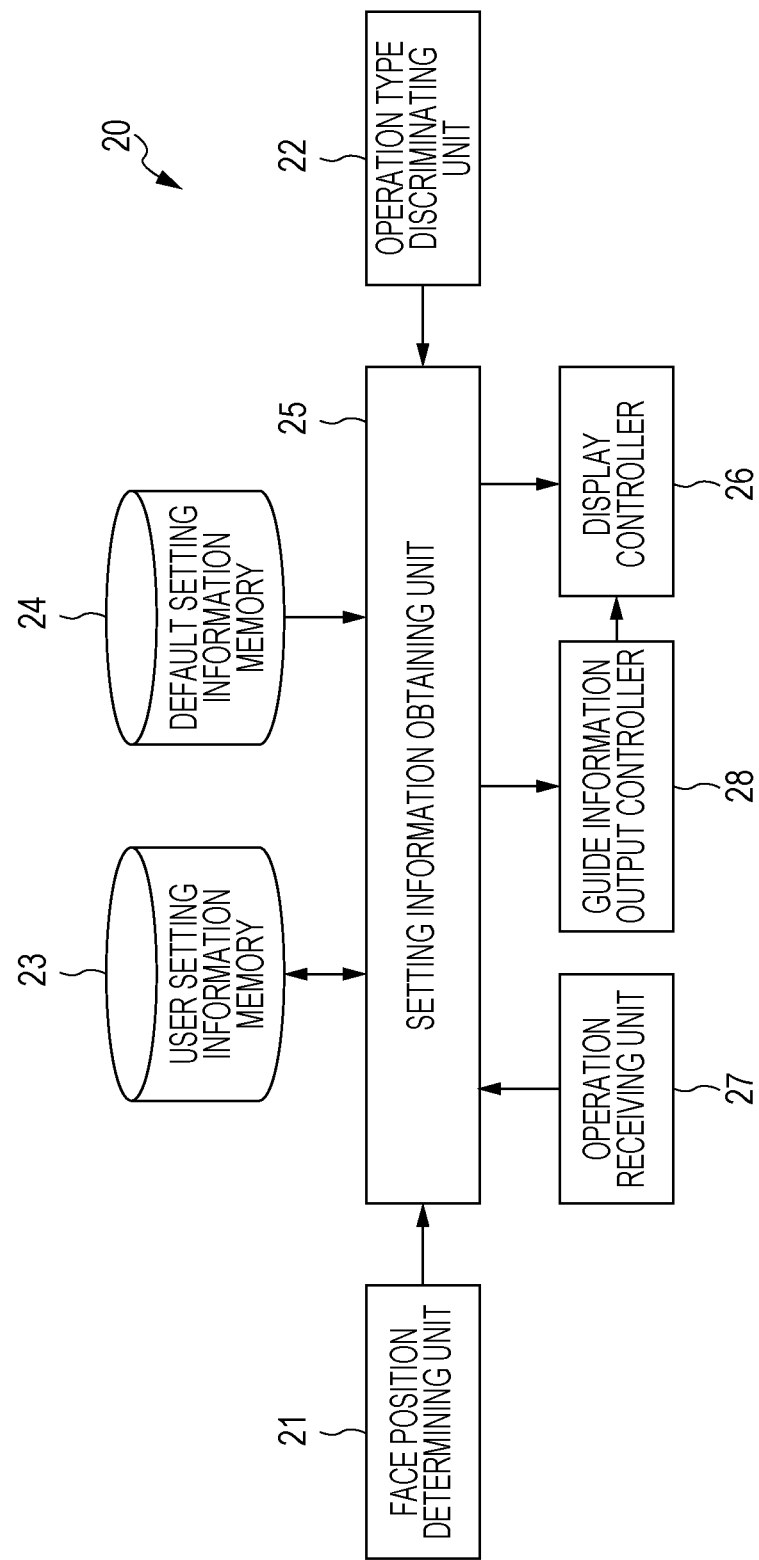
FIG. 2 is a block diagram illustrating an exemplary functional configuration of an operation flow guide apparatus according to the exemplary embodiment of the present invention.

FIG. 2 is a block diagram illustrating an exemplary functional configuration of an operation flow guide apparatus 20 according to the exemplary embodiment. Here, the operation flow guide apparatus 20 is understood as an apparatus realized by loading, by the CPU 11 (see FIG. 1) of the image processing apparatus 10, a program for realizing functional parts described later from, for example, the ROM 13 (see FIG. 1) to the RAM 12 (see FIG. 1) and executing the program. As illustrated in FIG. 2, the operation flow guide apparatus 20 includes a face position determining unit 21, an operation type discriminating unit 22, a user setting information memory 23, a default setting information memory 24, a setting information obtaining unit 25, a display controller 26, an operation receiving unit 27, and a guide information output controller 28.

The face position determining unit 21 determines whether the user's face is at a position where the user is able to see the details displayed on the operation panel 151. Such a determination may be made by checking whether the position of the user's face is less than or equal to a predetermined threshold. For example, assuming that the operation panel 151 is located horizontally on the image processing apparatus 10, if the user's face is above the operation panel 151, it is determined that the user's face is at a position where the user is able to see the details displayed on the operation panel 151; and, if the user's face is below the operation panel 151, it is determined that the user's face is not at a position where the user is able to see the details displayed on the operation panel 151. Such a determination may be made on the basis of an image of a portion above the operation panel 151, captured by the camera 191, and the result of detecting a human being in front of the image processing apparatus 10, performed by the sensor 192.

The operation type discriminating unit 22 discriminates the type of operation being done by the user. Such discrimination may be done by detecting, for example, error information indicating an error that occurred in the image processing apparatus 10, transition to a maintenance mode, the operation of pulling out a paper container (not illustrated) of the image processing apparatus 10, the operation of opening and closing a front cover (not illustrated) of the image processing apparatus 10, or the operation of opening and closing a front cover (not illustrated) of the finisher connected to the image processing apparatus 10. If such discrimination is unexecutable or wrong, the user may be allowed to interactively select the type of operation that the user is doing.

The user setting information memory 23 stores information regarding processing to be done for each operation type set by the user (hereinafter referred to as "user setting information"). The user setting information may include initial user setting information set initially on a personal information setting screen and previous user setting information set by the user previously (the last time). Specific examples of the user setting information will be described later.

The default setting information memory 24 stores information regarding processing to be done for each operation type set as default on the image processing apparatus 10 (hereinafter referred to as "default setting information").

If one of the initial user setting information and the previous user setting information is stored in the user setting information memory 23, the setting information obtaining unit 25 obtains, from the stored user setting information, setting information that corresponds to a user who is doing the operation and that corresponds to an operation type discriminated by the operation type discriminating unit 22. If none of the initial user setting information and the previous user setting information is stored in the user setting information memory 23, the setting information obtaining unit 25 obtains, from the default setting information stored in the default setting information memory 24, setting information that corresponds to a user who is doing the operation and that corresponds to an operation type discriminated by the operation type discriminating unit 22. The setting information obtaining unit 25 outputs the determined operation type and the obtained setting information to the display controller 26. In contrast, the setting information obtaining unit 25 obtains, from the later-described operation receiving unit 27, a guide method selected on a guide method selecting screen displayed on the operation panel 151. The setting information obtaining unit 25 stores, in the user setting information memory 23, the obtained guide method as setting information that corresponds to a user who is doing the operation and that corresponds to an operation type discriminated by the operation type discriminating unit 22, out of the previous user setting information. The setting information obtaining unit 25 outputs the obtained guide method and guide information that corresponds to the operation type discriminated by the operation type discriminating unit 22 to the guide information output controller 28.

The display controller 26 applies control to display, on the operation panel 151, a guide method selecting screen for selecting a guide method for the operation type obtained by the setting information obtaining unit 25 in a state where a guide method corresponding to the setting information obtained by the setting information obtaining unit 25 is selected. A specific example of the guide method selecting screen will be described later. The display controller 26 applies control to display guide information for providing a guide on an operation flow on the operation panel 151. In the exemplary embodiment, guide information for providing a guide on an operation flow is used as an example of operation guide information for providing a guide on an operation, and the display controller 26 is provided as an example of a display that displays operation guide information on a display screen.

When the user selects a guide method on the guide method selecting screen and performs an operation to confirm the selection, the operation receiving unit 27 receives the operation and informs the setting information obtaining unit 25 of the selected guide method. In the first place, a user who is doing an operation on the image processing apparatus 10 is highly likely to be unable to see the details displayed on the operation panel 151. Even if no operation is performed to select a guide method and to confirm that selection on the guide method selecting screen, when a predetermined time elapses, it is assumed that the firstly selected guide method is selected and the setting information obtaining unit 25 is informed of the selected guide method.

In accordance with the guide method received from the setting information obtaining unit 25, the guide information output controller 28 applies control to output the guide information received from the setting information obtaining unit 25. For example, on receipt of a tilt as the guide method, the guide information output controller 28 instructs the display controller 26 to display the guide information on the operation panel 151, and changes the tilt of the operation panel 151 in order to enable the user to see the details displayed on the operation panel 151. On receipt of mobile terminal display as the guide information, the guide information output controller 28 outputs the guide information to the wireless communication I/F 182 in order to wirelessly transmit the guide information to and display the guide information on a mobile terminal. Furthermore, on receipt of an audio guide as the guide method, the guide information output controller 28 outputs the guide information to the loudspeaker 152. In the exemplary embodiment, the guide information output controller 28 is provided as an example of a processor that performs processing to enable an operator to recognize operation guide information.

Now, the user setting information stored in the user setting information memory 23 will be described. FIG. 3 is a diagram illustrating an example of the user setting information. The user setting information may be understood as, for example, the initial user setting information initially set by the user. As illustrated in FIG. 3, the user setting information includes a record for each user. In this case, records for users A to D are illustrated. Each record includes, for each operation type, setting information regarding screen display and setting information regarding an audio guide. In this case, these items of setting information are illustrated for each of toner replacement, clearing of a paper jam, and feeding of paper. For example, when the user D is replacing a toner, the settings are made to perform mobile terminal display, but not to provide an audio guide.

Figure 4:
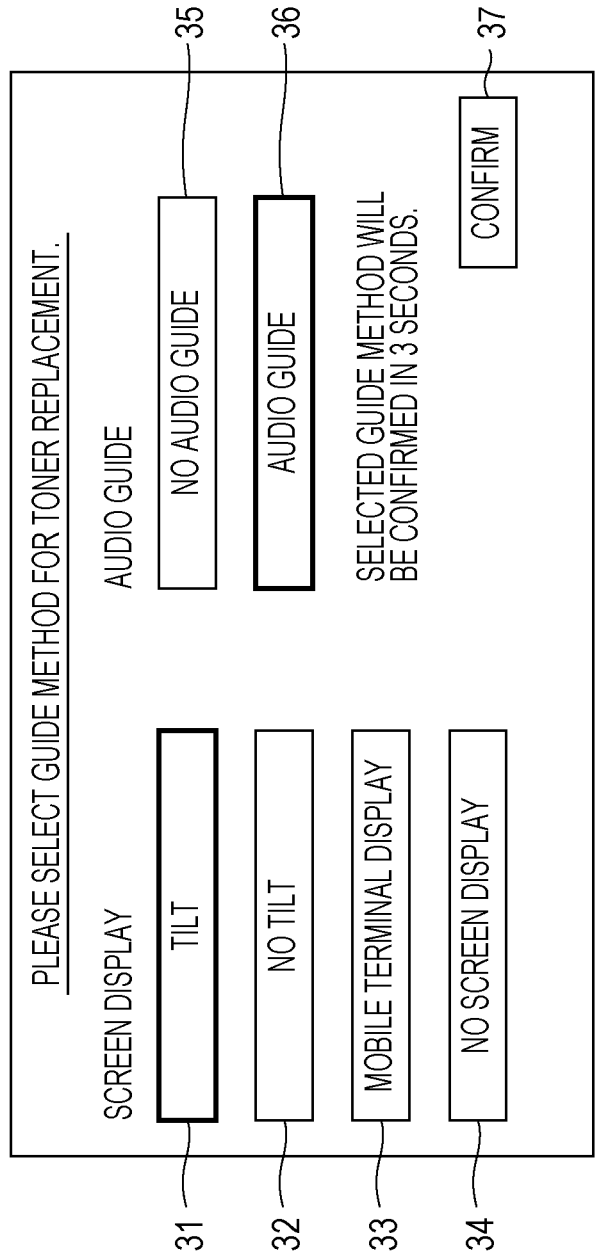
FIG. 4 is an illustration of an exemplary guide method selecting screen displayed by the operation flow guide apparatus according to the exemplary embodiment of the present invention.

The guide method selecting screen displayed by the display controller 26 on the operation panel 151 will be described. FIG. 4 illustrates an example of the guide method selecting screen. The guide method selecting screen is a screen for selecting how (in which guide method) a guide on toner replacement will be given. The guide method selecting screen includes a group of buttons for screen display and a group of buttons for an audio guide, as illustrated in FIG. 4.

Out of these groups, the group of buttons for screen display includes a "tilt" button 31, a "no tilt" button 32, a "mobile terminal display" button 33, and a "no screen display" button 34. The "tilt" button 31 is, for example, a button that indicates that displaying on the operation panel 151 is performed while tilting the operation panel 151, but displaying on a mobile terminal is not performed. The "no tilt" button 32 is, for example, a button that indicates that displaying on the operation panel 151 is performed without tilting the operation panel 151, and displaying on a mobile terminal is not performed. The "mobile terminal display" button 33 is, for example, a button that indicates that displaying on the operation panel 151 is performed without tilting the operation panel 151, and displaying on a mobile terminal is performed. The "no screen display" button 34 is, for example, a button that indicates that neither displaying on the operation panel 151 nor displaying on a mobile terminal is performed.

The group of buttons for an audio guide includes a "no audio guide" button 35 and an "audio guide" button 36. The "no audio guide" button 35 is a button that indicates that no audio guide is provided. The "audio guide" button 36 is a button that indicates that audio guide is provided.

As illustrated in FIG. 4, the guide method selecting screen further includes a "confirm" button 37. The "confirm" button 37 is a button for confirming the selected state of a button selected from the group of buttons for screen display and a button selected from the group of buttons for an audio guide. In this case, as indicated by bold rectangles, the "tilt" button 31 is selected from the group of buttons for screen display, and the "audio guide" button 36 is selected from the group of buttons for an audio guide. Therefore, upon pressing the "confirm" button 37, it is determined to tilt the operation panel 151 and to provide an audio guide. Alternatively, it may be confirmed to tilt the operation panel 151 and to provide an audio guide after a certain period of time elapses.

Processing of Operation Flow Guide Apparatus

Figure 5:
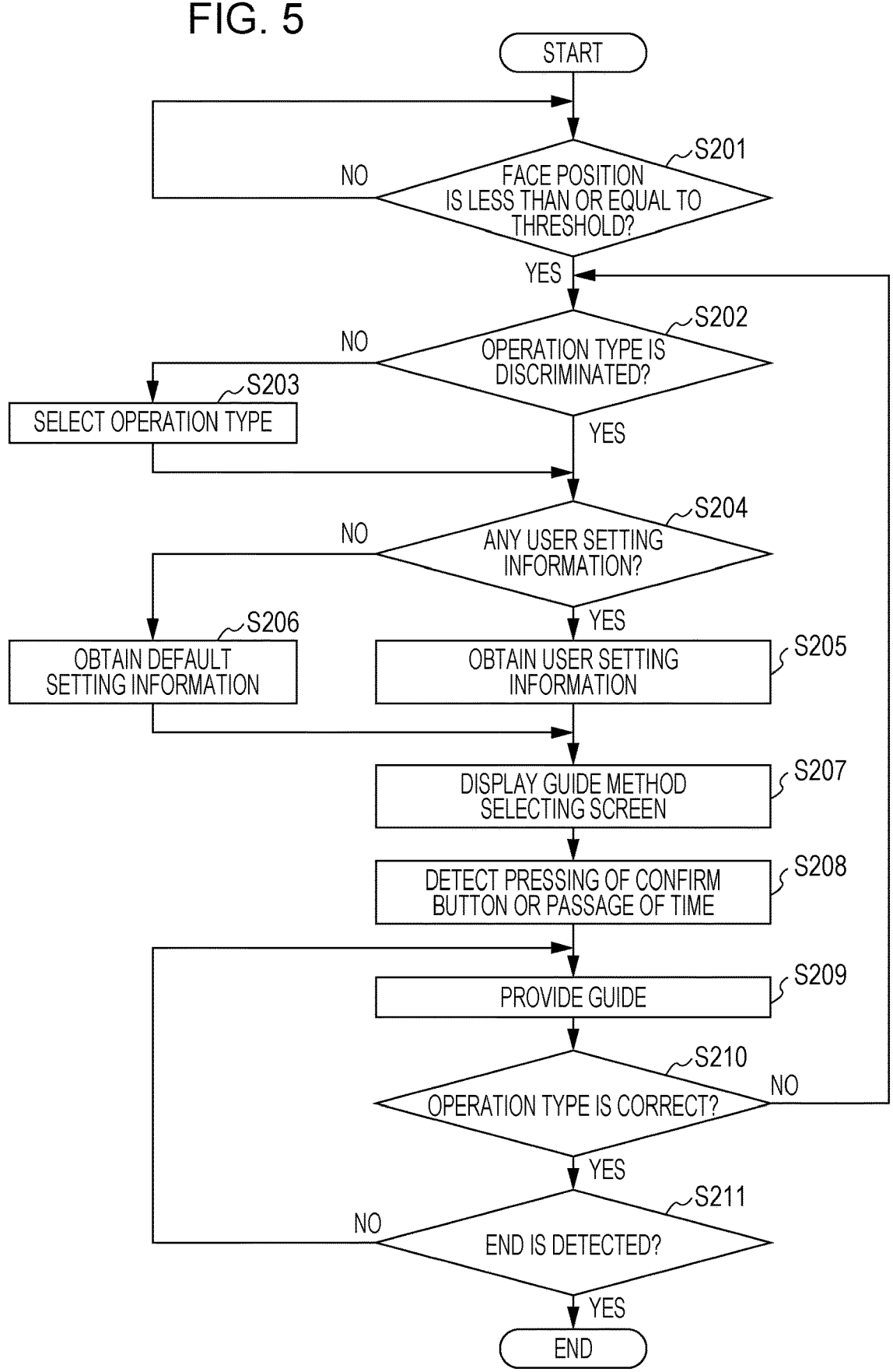
FIG. 5 is a flowchart illustrating exemplary processing of the operation flow guide apparatus according to the exemplary embodiment of the present invention.

FIG. 5 is a flowchart illustrating exemplary processing of the operation flow guide apparatus 20 according to the exemplary embodiment. It is assumed that, prior to this exemplary processing, the user has been authenticated and logged in. In this exemplary processing, it is also assumed that the "user setting information" may be either of the initial user setting information and the previous user setting information.

When the processing starts, the face position determining unit 21 in the operation flow guide apparatus 20 determines whether the position of the user's face is less than or equal to a predetermined threshold (step S201). Specifically, the face position determining unit 21 determines whether the height in the vertical direction of the user's face is less than or equal to a predetermined threshold. For example, the face position determining unit 21 simply determines that the height in the vertical direction of the user's face is less than or equal to a predetermined threshold when, while the sensor 192 is detecting a person in front of the image processing apparatus 10, the user's face is not included in an image captured by the camera 191 or when the user's face is at a position lower than a predetermined threshold in an image captured by the camera 191.

If the face position determining unit 21 determines that the position of the user's face is not less than or equal to the predetermined threshold, step S201 is repeated. In contrast, if the face position determining unit 21 determines that the position of the user's face is less than or equal to the predetermined threshold, the operation type discriminating unit 22 tries to discriminate the type of operation that the user is doing, and determines whether the type of operation has been discriminated (step S202). For example, when the operation type discriminating unit 22 detects error information indicating that the apparatus is running out of toner and detects the operation of opening and closing the front cover, the operation type discriminating unit 22 discriminates that the operation type is toner replacement, and thus determines that the operation type has been discriminated. When the operation type discriminating unit 22 detects error information indicating that the apparatus is running out of paper and detects the operation of pulling out the paper container, the operation type discriminating unit 22 discriminates that the operation type is feeding of paper, and thus determines that the operation type has been discriminated. Furthermore, when the operation type discriminating unit 22 detects error information indicating a paper jam and detects the operation of opening and closing the front cover, the operation type discriminating unit 22 discriminates that the operation type is clearing of a paper jam, and thus determines that the operation type has been discriminated.

If the operation type discriminating unit 22 determines that the operation type has not been discriminated, the operation type discriminating unit 22 prompts the user to select the operation type on the operation panel 151, for example (step S203). When the operation type discriminating unit 22 determines in step S202 that the operation type has been discriminated or when the user selects the operation type in step S203, the setting information obtaining unit 25 determines whether the user setting information is stored in the user setting information memory 23 (step S204).

If the setting information obtaining unit 25 determines that the user setting information is stored in the user setting information memory 23, the setting information obtaining unit 25 obtains the user setting information from the user setting information memory 23 (step S205). Note that it is assumed that the setting information obtaining unit 25 obtains, out of the user setting information, setting information that corresponds to the user who is doing the operation and that corresponds to the discriminated operation type. For example, when the user setting information illustrated in FIG. 3 is stored in the user setting information memory 23, if the user who is doing the operation is user D and the operation type is toner replacement, the setting information obtaining unit 25 obtains "mobile terminal display" and "no audio guide" as the setting information.

In contrast, if the setting information obtaining unit 25 determines that the user setting information is not stored in the user setting information memory 23, the setting information obtaining unit 25 obtains the default setting information from the default setting information memory 24 (step S206). Note that it is assumed that the setting information obtaining unit 25 obtains, out of the default setting information, setting information that corresponds to the user who is doing the operation and that corresponds to the discriminated operation type.

Accordingly, the display controller 26 applies control to display a guide method selecting screen on the operation panel 151 (step S207). Specifically, the display controller 26 applies control to display, on the operation panel 151, a guide method selecting screen that corresponds to the operation type discriminated by the operation type discriminating unit 22, in a state where a guide method corresponding to the setting information obtained by the setting information obtaining unit 25 is selected.

The operation receiving unit 27 detects the operation of pressing the "confirm" button 37 on the guide method selecting screen or the passage of a predetermined period of time (step S208). In response to this, the image processing apparatus 10 provides a guide (step S209). Specifically, at first the operation receiving unit 27 detects selection of a button on the guide method selecting screen, and reports a guide method indicated by the selected button to the setting information obtaining unit 25. Next, the setting information obtaining unit 25 reports the guide method and the guide information to the guide information output controller 28. Next, the guide information output controller 28 applies control to output the guide information, reported by the setting information obtaining unit 25, using the guide method, reported by the setting information obtaining unit 25.

Thereafter, the setting information obtaining unit 25 determines whether the operation type to which the guide information currently being output corresponds is correct (step S210). Such a determination may be made on the basis of a response received from the user after asking the user whether the operation type is correct.

When the user is continuously doing the same operation, the setting information obtaining unit 25 determines that the operation type is correct. In this case, the operation receiving unit 27 determines whether a user operation reporting the end of the operation has been detected (step S211). If the operation receiving unit 27 determines that a user operation reporting the end of the operation has not been detected, the process returns to step S209, and the image processing apparatus 10 continuously provides the guide. In contrast, if the operation receiving unit 27 determines that a user operation reporting the end of the operation has been detected, the process ends.

Meanwhile, when the user continuously does a different operation, such as when the user feeds paper after replacing the toner, the setting information obtaining unit 25 determines that the operation type is incorrect. In this case, the process returns to step S202, and the operation type discriminating unit 22 again discriminates the operation type.

Note that, in the exemplary embodiment, guide information is output in response to detection of the fact that the user's face is at a position lower than a predetermined position and detection of a physical operation on the image processing apparatus 10 or error information occurring in the image processing apparatus 10. Alternatively, the image processing apparatus 10 may return to a normal state where printing or copying is performed from a state where guide information is output, in response to detection of the fact that the user's face is at a position higher than a predetermined position and detection of the end of a physical operation on the image processing apparatus 10 or cancellation of error information occurring in the image processing apparatus 10.

The user's height may be estimated on the basis of an image captured by the camera 191, although this is not mentioned above. For example, the user's height may be estimated from the position in the vertical direction in the image of the vertex of the user's head included in the image. The operation panel 151 may be tilted by an angle corresponding to the user's height after comparing the height with a height table stored in the HDD 14 or the like. For example, it is assumed that the tilt angle X degrees for the height 100 to 100 cm and the tilt angle Y degrees for the height 110 to 120 cm are defined in the height table. In this case, when the user's height is estimated to be 100 to 110 cm, the operation panel 151 is tilted by X degrees; and, when the user's height is estimated to be 110 to 120 cm, the operation panel 151 is tilted by Y degrees. Also in this case, although guide information may be displayed on the operation panel 151, the operation panel 151 may be tilted on the basis of the user's height in an operation where no guide is provided, such as in printing or copying.

Furthermore, although the above description is given on the assumption that guide information is displayed on the operation panel 151 on the image processing apparatus 10, the exemplary embodiment is applicable to a terminal device with a large screen user interface (UI) located separately from the image processing apparatus 10.

Furthermore, although the above description is about the case where the operation flow guide apparatus 20 included in the image processing apparatus 10 outputs guide information for an operation done on the image processing apparatus 10, the exemplary embodiment is not limited to this case. Guide information for an operation done on the image processing apparatus 10 may be more generalized as guide information for an operation done on a device. Such guide information for a device may be output from a section independent of the device, instead of from a section included in the device.

Program

Processing performed by the operation flow guide apparatus 20 according to the exemplary embodiment is prepared as a program such as application software.

That is, a program for realizing the exemplary embodiment is understood as a program for causing a computer to realize the function of displaying, on a display screen, operation guide information for providing a guide on an operation for continuously using a device, and the function of performing processing to enable an operator who is doing the operation with such a posture that the operator is unable to see the operation guide information displayed on the display screen to recognize the operation guide information.

Needless to say, the program for realizing the exemplary embodiment may be provided by a communication unit or by being stored in a recording medium such as a compact-disc read-only memory (CD-ROM) or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operation guide apparatus comprising:
a display that displays, on a display screen, operation guide information for providing a guide on an operation for continuously using a device, wherein the operation is one of multiple types of operations; and
a processor programmed to perform processing to enable an operator who is doing the operation with such a posture that the operator is unable to see the operation guide information displayed on the display screen to recognize the operation guide information by:
detecting a height of a face of the operator,
determining whether or not the height of the operator's face is lower than or equal to a predetermined height, the predetermined height being a height of the display screen;
determining that the user is unable to see the operation guide information displayed on the display screen when it is determined that the height of the operator's face is lower than or equal to the predetermined height, and
when it is determined that the height of the operator's face is lower than or equal to the predetermined height:
selecting a guide method for output of the operation guide information, the guide method selected from options comprising adjusting tilt of the display screen, outputting the operation guide information audibly via a speaker, and outputting the operation guide information to a mobile terminal of the operator,
displaying an indication of the selected guide method on the display screen, and
performing the selected guide method upon occurrence of any of:
receipt of a confirmation of the selected guide method from the operator, and
passage of a predetermined amount of time after displaying the indication of the selected guide method on the display.

2. The operation guide apparatus according to claim 1, wherein when the processor is programmed to perform adjusting tilt of the display screen by tilting the display screen in such a direction that the operator is able to see the operation guide information.

3. The operation guide apparatus according to claim 2, wherein the processor is programmed to determine the tilting direction based on the operator's height.

4. The operation guide apparatus according to claim 2, wherein the operation for continuously using the device comprises one of a replacement of consumables, a repair operation, a collection of unwanted materials, or a maintenance operation.

5. The operation guide apparatus according to claim 1, wherein the processor is programmed to select the guide method based on a selection determined in advance for the operator.

6. The operation guide apparatus according to claim 1, wherein the processor is programmed to select the guide method based on a selection determined in advance for the operation being done by the operator.

7. The operation guide apparatus according to claim 1, wherein the processor is programmed to perform all of adjusting tilt of the display screen, outputting the operation guide information audibly via a speaker, and outputting the operation guide information to a mobile terminal of the operator, and wherein selecting the guide method comprises selecting to perform at least one of adjusting tilt of the display screen, outputting the operation guide information audibly via a speaker, and outputting the operation guide information to a mobile terminal of the operator.

8. An image processing apparatus comprising:
   a display that displays, on a display screen, operation guide information for providing a guide on an operation comprising at least one of replacement of a consumable item used for image processing, replenishment of the consumable item, and repairing of a failure that occurred during image processing; and
   a processor programmed to perform processing to enable an operator who is doing the operation at such a position that the operator is unable to see the operation guide information displayed on the display screen to recognize the operation guide information, by:
      detecting a height of a face of the operator,
      determining whether or not the height of the operator's face is lower than a predetermined height, the predetermined height being a height of the display screen;
      determining that the user is unable to see the operation guide information displayed on the display screen when it is determined that the height of the operator's face is lower than or equal to the predetermined height, and
      when it is determined that the height of the operator's face is lower than the predetermined height:
         selecting a guide method for the output of the operation guide information, the guide method selected from options comprising adjusting tilt of the display screen, outputting the operation guide information audibly via a speaker, and outputting the operation guide information to a mobile terminal of the operator,
         displaying an indication of the selected guide method on the display screen, and
         performing the selected guide method upon occurrence of any of:
            receipt of a confirmation of the selected guide method from the operator, and
            passage of a predetermined amount of time after displaying the indication of the selected guide method on the display.

9. A non-transitory computer readable medium storing a program causing a computer to execute a process, the process comprising:
   displaying, on a display screen, operation guide information for providing a guide on an operation for continuously using a device, wherein the operation is one of multiple types of operations; and
   performing processing to enable an operator who is doing the operation with such a posture that the operator is unable to see the operation guide information displayed on the display screen to recognize the operation guide information, by:
      detecting a height of a face of the operator,
      determining whether or not the height of the operator's face is lower than a predetermined height, the predetermined height being a height of the display screen;
      determining that the user is unable to see the operation guide information displayed on the display screen when it is determined that the height of the operator's face is lower than or equal to the predetermined height, and
      when it is determined that the height of the operator's face is lower than the predetermined height:
         selecting a guide method for the output of the operation guide information, the guide method selected from options comprising adjusting tilt of the display screen, outputting the operation guide information audibly via a speaker, and outputting the operation guide information to a mobile terminal of the operator,
         displaying an indication of the selected guide method on the display screen, and
         performing the selected guide method upon occurrence of any of:
            receipt of a confirmation of the selected guide method from the operator, and
            passage of a predetermined amount of time after displaying the indication of the selected guide method on the display.

* * * * *